(12) United States Patent
Hockman et al.

(10) Patent No.: US 7,803,730 B2
(45) Date of Patent: Sep. 28, 2010

(54) METHOD OF MANUFACTURING GLASS AND COMPOSITIONS THEREOF

(75) Inventors: John Albert Hockman, Bath, PA (US); Stephen Andrew Hrizuk, Easton, PA (US)

(73) Assignee: Specialty Minerals (Michigan) Inc., Bingham Farms, MI (US)

( * ) Notice: Subject to any disclaimer, the term of this patent is extended or adjusted under 35 U.S.C. 154(b) by 898 days.

(21) Appl. No.: 11/540,795

(22) Filed: Sep. 29, 2006

(65) Prior Publication Data

US 2007/0021287 A1  Jan. 25, 2007

Related U.S. Application Data

(63) Continuation-in-part of application No. 10/493,902, filed on Apr. 27, 2004, now Pat. No. 7,383,699.

(51) Int. Cl.
C03C 6/08 (2006.01)
C03C 6/00 (2006.01)
C03C 6/02 (2006.01)
C03B 9/00 (2006.01)
C03B 19/10 (2006.01)
C03B 23/00 (2006.01)
C03B 37/00 (2006.01)

(52) U.S. Cl. ............... 501/29; 501/27; 65/21.1; 65/21.5

(58) Field of Classification Search ............ 501/11, 501/14, 20, 21, 27, 29; 65/21.1, 21.2, 21.5
See application file for complete search history.

(56) References Cited

U.S. PATENT DOCUMENTS

| | | | |
|---|---|---|---|
| 3,082,102 A | 3/1963 | Cole et al. |
| 3,381,064 A | 4/1968 | Yamaguchi et al. |
| 3,458,331 A | 7/1969 | Kroyer |
| 3,520,705 A | 7/1970 | Shido et al. |
| 3,682,666 A | 8/1972 | Lacourrege |
| 3,802,901 A | 4/1974 | Robertson et al. |
| 3,817,776 A | 6/1974 | Gringras |
| 3,875,288 A | 4/1975 | Hoffman et al. |
| 3,883,364 A | 5/1975 | Robertson et al. |
| 3,926,647 A | 12/1975 | Wuhrer |

(Continued)

FOREIGN PATENT DOCUMENTS

DE   141 015   4/1980

(Continued)

OTHER PUBLICATIONS

"Glass", Kirk—Ohmer, Encyclopedia of Chemical Technology, 4th Edition 1994, vol. 12, pp. 555-569, 593-601.

(Continued)

*Primary Examiner*—Karl E Group
*Assistant Examiner*—Noah S Wiese
(74) *Attorney, Agent, or Firm*—Leon Nigohosian, Jr.

(57) ABSTRACT

A solid state particle agglomerate and method for producing the solid state particle agglomerate are provided. The alkaline earth metal source material, aluminum source material and silicon source material that comprise the solid state particle agglomerate are uniformly distributed and in close proximity within the solid state particle agglomerate, enabling the solid state particle agglomerate to form glass in a more energy efficient manner when heated.

20 Claims, 1 Drawing Sheet

U.S. PATENT DOCUMENTS

| | | | |
|---|---|---|---|
| 3,941,574 A | | 3/1976 | Melkonian et al. |
| 3,956,446 A | | 5/1976 | Eirich et al. |
| 3,967,943 A | | 7/1976 | Seeley |
| 3,969,100 A | | 7/1976 | Kuna et al. |
| 4,023,976 A | * | 5/1977 | Bauer et al. .................. 501/29 |
| 4,026,691 A | | 5/1977 | Lovett et al. |
| 4,028,131 A | * | 6/1977 | Pons ........................... 501/29 |
| 4,110,097 A | | 8/1978 | Chevallier et al. |
| 4,184,861 A | * | 1/1980 | Erickson et al. ................ 65/27 |
| 4,248,615 A | | 2/1981 | Seng et al. |
| 4,252,754 A | * | 2/1981 | Nakaguchi et al. ............ 264/12 |
| 4,474,594 A | * | 10/1984 | Lazet ............................ 65/27 |
| 4,519,814 A | | 5/1985 | Demarest, Jr. |
| 4,539,030 A | | 9/1985 | Demarest, Jr. et al. |
| 4,612,292 A | | 9/1986 | Richard |
| 4,634,461 A | | 1/1987 | Demarest, Jr. et al. |
| 4,920,080 A | | 4/1990 | Demarest, Jr. |
| 5,004,706 A | | 4/1991 | Dickinson |
| 5,100,840 A | | 3/1992 | Urabe et al. |
| 5,422,320 A | | 6/1995 | Adams, Jr. et al. |
| 5,900,052 A | | 5/1999 | Nakajima et al. |
| 6,211,103 B1 | | 4/2001 | Tomaino et al. |
| 6,271,159 B1 | | 8/2001 | Fairchild et al. |
| 6,287,378 B1 | | 9/2001 | Fairchild et al. |
| 6,287,997 B1 | | 9/2001 | Fairchild et al. |
| 6,358,870 B1 | | 3/2002 | Szczesniewski et al. |
| 2005/0022557 A1 | | 2/2005 | Carty |

FOREIGN PATENT DOCUMENTS

| | | |
|---|---|---|
| DE | 42 28 500 A1 | 3/1994 |
| GB | 1376473 | 12/1974 |
| JP | 53-139621 | 12/1978 |
| JP | 55-149122 | 11/1980 |
| JP | 59-64563 | 4/1984 |
| JP | HEI2-141454 | 5/1990 |
| JP | 10-291852 | 11/1998 |
| SU | 644731 | 1/1979 |
| SU | 823285 | 4/1981 |
| SU | 981217 | 12/1982 |
| SU | 340257 A | 5/1983 |

OTHER PUBLICATIONS

Mirkovich, V.V.; "Utilization of Diopside in the Manufacture of Glass," *Mines Branch Technical Bulletin TB 192*; Dept. of Energy, Mines and Resources (Ottawa, Canada 1974).

Mirkovich, V.V. et al.; "Utilization of Diopside in the Manufacture of Glass, Part II"; *Journal of the Canadian Ceramic Society*; vol. 44, pp. 43-47; (1975).

* cited by examiner

METHOD OF MANUFACTURING GLASS AND COMPOSITIONS THEREOF

This application is a continuation-in-part of application Ser. No. 10/493,902, filed Apr. 27, 2004, now U.S. Pat. No. 7,383,699.

The present invention relates to a solid state particle agglomerate and a glass-making process utilizing such solid state particle agglomerate.

Glass manufacturers continually look for ways to maximize the energy efficiency of the glass-making process as well as maximize the quality and consistency of the final glass product. As a result, glass manufacturers are concerned with the raw materials, thermodynamics and other characteristics of the glass-making reactions in glass furnaces. The glass manufacturing process generally involves the reaction of raw materials that make up a "glass batch". These glass batch raw materials may include, but are not limited to, silica (silicon dioxide from sand, quartz and the like), soda ash (sodium carbonate), lime (calcium oxide from quicklime, hydrated lime and the like), alumina (aluminum oxide from feldspathic materials, alumina hydrate and the like) metal oxides of lead, lithium, cerium, iron, magnesium, potassium, barium, boron and the like.

Frequently, a non-uniform distribution of these glass batch raw materials, a phenomenon known as glass batch "segregation", can occur during mixing and transfer of the glass batch. The segregation of glass batch raw materials is due to factors such as, but not limited to, differences in the particle size of the glass batch raw materials, differences in the densities of the glass batch raw materials, non-uniform raw material flow during glass batch transfer and the like. In terms of the glass melting process, the segregation of glass batch raw materials results in undesirable side-reactions, often leading to longer melting and refining times. In terms of the final glass product, the segregation of glass batch raw materials results in fluctuations and imperfections including, but not limited to, blisters, seeds, cords, color variations and the like.

In order to maximize the energy efficiency of the glass-making process, it is desirable to maintain a close proximity and/or intimate contact of the glass batch raw materials. However, due to factors including, but not limited to, inefficient particle packing within the glass batch, segregation of the glass batch raw materials and the like, there is often an inhomogeneous distribution of particles having significant inter-particle void spaces. The result is that significantly more energy is required to ultimately obtain a substantially homogeneous molten state within the glass batch.

Various approaches have been investigated to address these limitations of the glass manufacturing process. These approaches include, but are not limited to, varying the type and physical properties of the glass batch raw materials, varying the process schemes for the reaction of these glass batch raw materials and the like. For example, one approach involves calcining limestone and/or dolomite to form the corresponding oxides prior to use as a glass batch raw material. This calcination releases carbon dioxide from these glass batch raw materials that would otherwise be released during the glass-making process. This elimination of carbon dioxide before melting begins is advantageous since it reduces the entrapment of gaseous inclusions in the glass. Other processes involve using various raw materials to modify the reaction's thermodynamics, quality or yield. Still other processes involve the formation of pellets containing the glass batch raw materials and a sodium-based binder material. While advances have been made, there still exists the need for developing processes and raw materials to improve glass-making processes, particularly as they relate to improving the energy efficiency of glass-making processes.

SUMMARY

In some embodiments, a glass batch material in a solid state particle agglomerate form is described. The solid state particle agglomerate comprises a plurality of granules, each granule being an aggregate of glass batch materials. Each granule comprises an alkaline earth metal source material, an aluminum source material and a silicon source material in a desired composition and preferably the composition is uniform from granule to granule. The alkaline earth metal source material, aluminum source material and silicon source material are uniformly distributed and in close proximity within each of the granules of the solid state particle agglomerate, enabling the solid state particle agglomerate to form glass in a more energy efficient manner when heated.

The particular glass product to be made will determine the particular composition of the raw materials for the glass batch. In turn, the desired composition of the granules in the solid state particle aggregate of the present invention is determined by the composition of the glass batch.

Furthermore, depending on the particular glass product to be made, the composition of the granules in the solid state particle aggregate may be equal to the composition of the glass batch. In other words, in these embodiments, all of the raw materials making up the glass batch for a given glass product is provided in a solid state particle aggregate in granule form. In other embodiments, only a portion of the raw materials making up the glass batch may be provided in a sold state particle aggregate form and the remainder of the glass batch in conventional loose form is mixed and blended with the granules of the sold state particle aggregate to make up the total glass batch. In either case, when such glass batches are heated to make the desired glass product, the glass forming reactions within the glass batch will take place at lower temperature and result in more energy efficient glass manufacturing processes.

In some embodiments, a process for producing a solid state particle agglomerate is disclosed herein. The solid state particle agglomerate is produced by admixing an alkaline earth metal source material, an aluminum source material and a silicon source material, forming granules from the admixture, heat treating the granules and sizing the granules through one or more crushing and screening steps to obtain granules of the solid state particle agglomerate within a desired particle size range suitable for use in the manufacture of glass. Where additional durability strength is required of the granules for handling purposes, a suitable binder may be added to the raw materials in forming the granules for the solid state particle aggregate.

In further embodiments, a process for producing a molten glass is provided. First, an alkaline earth metal source material, an aluminum source material and a silicon source material are mixed. Then the mixture is formed into granules. The granules are heat treated to remove moisture. The granules are then sized through one or more crushing and screening steps to obtain a solid state particle agglomerate having a desired particle size range suitable for use in the manufacture of glass. Heating the resulting solid state particle agglomerate produces a molten glass. Because of the structure of the granules in the solid state particle agglomerates, the glass forming reaction process upon heating is carried out in much more energy efficient manner.

DETAILED DESCRIPTION

Figure 1:
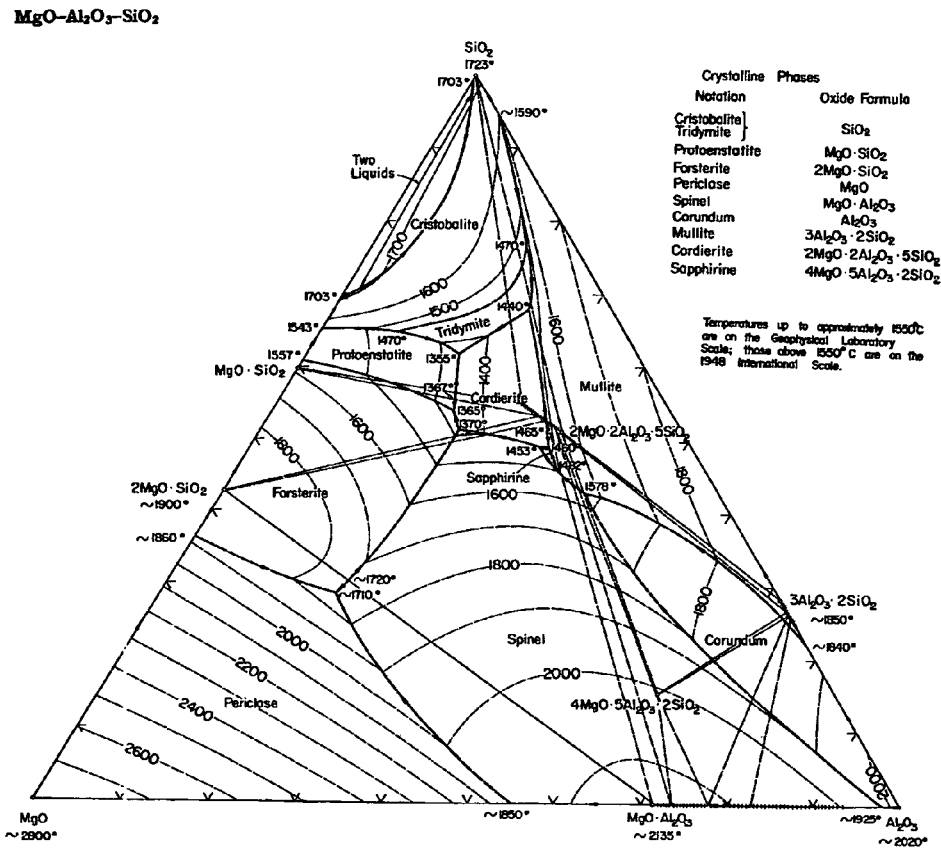
FIG. 1 is a ternary phase diagram for a $MgO$—$Al_2O_3$—$SiO_2$ system, compounds forming an exemplary solid state particle agglomerate, that shows the equilibrium phases associated with various combinations of temperature and composition.

Some embodiments provide a process that includes providing a portion of a glass batch in a solid state particle agglomerate form and the remainder of the glass batch in conventional loose form. When the mixture of the solid state particle agglomerate and the remainder of the glass batch is heated, the eutectic character of the loose form batch is lowered. As used herein, "eutectic character" of a glass batch is defined as the temperature needed by two or more glass batch raw materials in physical contact with each other to drive the glass-forming reactions as well as the path of the reaction and the impact of such on the reaction kinetics and speed. As used herein, "solid state particle agglomerate" refers to an aggregate of particles or granules. Each of the granules comprises a mixture of raw materials such as calcium hydroxide, magnesium oxide, magnesium hydroxide, alumina, silica and, in some embodiments, a binder.

The raw materials that make up the solid state particle agglomerate are uniformly distributed and in close proximity to each other within the solid state particle agglomerate such that, when heated, will react to produce one or more compounds that may include, but is not limited to, calcium aluminosilicate, magnesium aluminosilicate and the like. The formation of these aluminosilicate compounds improves the energy efficiency of the glass-making process. In some embodiments, the solid state particle agglomerates are of a size to enable the solid state particle agglomerates to be uniformly blended with the remainder of the glass batch.

As used herein, the term "uniformly distributed" as applied to the solid state particle agglomerate refers to the homogeneity in the overall composition of the solid state particle agglomerate such that the desired chemical composition is achieved throughout the solid state particle agglomerate. As used herein, the term "close proximity" as applied to the solid state particle agglomerate refers to the close, packed arrangement of the raw materials that comprise the solid state particle agglomerate. As a result of this close, packed arrangement, the density of the solid state particle agglomerate is greater than the density of a loose mixture of the raw materials in a glass batch. In a non-limiting example, the density of the solid state particle agglomerate was 79 pounds per feet$^3$, compared to a density of 63 pounds per feet$^3$ for a loose mixture of the raw materials used to make up the solid state particle agglomerate. The higher density of the solid state particle agglomerate results in fewer and/or smaller inter-particle void spaces and further results in better energy efficiency for the glass manufacturing process. Additionally, because the raw materials that comprise the solid state particle agglomerate are formed into individual granules, (which, each on their own are agglomerated masses themselves), they are less prone to segregation compared to a loose mixture of the raw materials in a glass batch. Furthermore, since each of the granules in the agglomerate has the raw materials uniformly distributed in a desired composition, the overall glass batch, in turn, is more homogeneous.

In some embodiments, the granules in the solid state particle agglomerate comprises glass batch raw materials containing silica, one or more oxides, hydroxides or other mineral sources of calcium, magnesium, and aluminum. Generally, the granules formed according to the process described herein have sufficient structural integrity and strength to maintain their granulated form through handling and any blending that may be required to blend with other raw materials that may be required for a particular glass batch. In other embodiments, the solid state particle agglomerate comprises glass batch raw materials containing silica, one or more oxides, hydroxides or other mineral sources of calcium, magnesium, and aluminum, and a binder in an amount sufficient to provide structural integrity and strength to the solid state particle agglomerate for handling and blending with the other glass batch raw materials.

The particular composition of the solid state particle agglomerate may be formulated to provide a desired glass batch composition when the solid state particle agglomerate is admixed with the additional glass batch raw materials. In other words, the formulation of a solid state particle agglomerate made according to the invention combined with the remainder of the glass batch raw materials defines the final glass product formulation. Thus, to produce a final glass product of a known formulation utilizing the improved glass-making process of the invention, a desired portion of the raw materials from the known formulation of the final glass product is used to make the solid state particle agglomerate. Then, the remaining portion of the raw materials from the known formulation of the final glass product forms the remainder of the glass batch.

The solid state particle agglomerate preferably in particulate form of optimal size is then uniformly admixed with the remainder of the glass batch and heated to an appropriate temperature causing the solid state particle agglomerate to react and form an aluminosilicate or an aluminosilicate-like eutectic. The appropriate temperature will depend on the particular composition of the granules comprising the solid state particle agglomerate. Because a portion of the silica in the total glass batch formulation has reacted to form an aluminosilicate or aluminosilicate-like eutectic, the result is that, in the remainder of the glass batch, the flux (typically sodium or boron) to silica ratio is at a higher level than in conventional glass-making process where all of the glass batch raw materials are mixed together. This results in a lower forming temperature of the remainder glass batch and in turn the final glass product is formed at lower temperature. The lower forming temperature of the final glass product results in a more energy-efficient and time-efficient glass-making process, resulting in higher throughput.

Another aspect of the invention is that by controlling the particulate size of the solid state particle agglomerate to be sufficiently fine, the solid state particle agglomerate can be uniformly mixed with the remainder of the glass batch raw materials. This uniformity of the glass batch promotes uniform glass-forming reaction in the glass batch and the final glass product having more uniform composition and properties.

In some embodiments, the raw materials comprising one or more sources of calcium, magnesium, aluminum and silicon are formed into the solid state particle agglomerate. The solid state particle agglomerate is then admixed with a mass containing a balance of other glass-forming materials. Such other glass-forming materials may include, but are not limited to oxide-containing materials having the general formula $R_2O$, where R is an alkali metal such as sodium or potassium, oxide-containing materials having the general formula R'O, where R' is an alkaline earth metal such as calcium or magnesium, additional silicon-containing materials and the like. In some embodiments, the glass-forming material is a sodium oxide-containing material such as, but not limited to sodium hydroxide, sodium carbonate, sodium sulfate, sodium nitrate, feldspar, nepheline syenite and the like. In other embodiments, the glass-forming material is a potassium oxide-containing material such as, but not limited to potassium hydroxide, potassium carbonate, potassium sulfate, potassium nitrate, feldspar, nepheline syenite and the like. These other glass-forming materials are used as needed to produce the desired glass composition.

In alternative embodiments, the total glass batch is provided in the form of a solid state particle agglomerate. Raw materials that comprise the total glass batch are formed into granules comprising the solid state particle agglomerate. In an example, the total glass batch includes, but not limited to, silica, one or more oxides, hydroxides or other mineral sources of calcium, magnesium, aluminum and the like. The raw material components of the glass batch provided in desired particles sizes are formed into granules according to the granulation process described herein. The granules generally have sufficient durability and strength to hold the granule form until the solid state particle agglomerate is used to make glass. However, in some embodiments, the raw materials that comprise the total glass batch are admixed with a binder to form the granules that have sufficient durability for handling etc. In other embodiments, the raw materials that comprise the total glass batch are admixed without a binder and formed into a solid state particle agglomerate.

The solid state particle agglomerate that comprises the total glass batch is heated to produce a molten glass. The raw materials comprising the total glass batch are uniformly distributed and in close proximity in the form of a solid state particle agglomerate. Because the total glass formulation is "self-contained" within the solid state particle agglomerate, there is less tendency for glass batch segregation to occur compared to a loose mixture of raw materials comprising the total glass batch. Additionally, there are fewer and/or smaller inter-particle void spaces when the total glass batch is in the form of a solid state particle agglomerate as compared to a loose mixture of the glass batch, resulting in better energy efficiency for the glass forming reaction process. Because of these structural improvements among the raw materials within each of the granules of the solid state particle agglomerate, when the solid state particle agglomerate is heated to an appropriate temperature, the raw material components of the granules react efficiently and form an aluminosilicate or an aluminosilicate-like eutectic. The appropriate temperature to initiate this reaction will depend on the particular composition of the granules comprising the sold state particle agglomerate but the glass forming reaction takes place at lower temperature than with a conventional glass batch of the same composition where the raw materials are provided in loose form.

The solid state particle agglomerate is formed by mechanically producing granules from the mixture of raw materials through any forming technologies that include but are not limited to pellet pressing with dies, spray drying, pan pelletizing, turbulizing and the like. The formed granule is then heat treated to remove moisture and increase strength, then sized appropriately using standard crushing and screening techniques.

The calcium source material of the solid state particle agglomerate may be either calcium oxide, calcium hydroxide or a calcium-containing mineral. Sources of calcium oxide, calcium hydroxide or a calcium-containing mineral may include, but are not limited to, dolomite lime, dolomitic limestone, calcite, lime, colemanite, natural diopside and wollastonite, ulexite, gypsum, fluorspar, aragonite, feldspar and the like. The particle size of the calcium source material used in the solid state particle agglomerate is preferably less than 0.0075 centimeters to promote a thermodynamic advantage towards the solid state particle agglomerate reaction versus the standard glass reaction. More preferably, at least about 90% of the calcium source material has a particle size of less than 0.0075 centimeters. As used herein, the term "thermodynamic advantage" refers to the consequential effect of particle size on reducing the rate of reaction within the granule. For instance, it is known that smaller particle size raw materials have higher available surface area for reacting and when mixed with other raw materials in the granule will allow for a more homogenous mixture within the granule thus promoting faster reaction rates.

The magnesium source material of the solid state particle agglomerate may be either magnesium oxide, magnesium hydroxide or a magnesium-containing mineral. Sources of magnesium oxide, magnesium hydroxide or a magnesium-containing mineral may include, but are not limited to, dolomitic lime, dolomitic limestone, natural diopside, brucite, periclase, epsom salt and the like. The particle size of the magnesium source material used in the solid state particle agglomerate is preferably less than 0.0075 centimeters to promote a thermodynamic advantage towards the solid state particle agglomerate reaction versus the standard glass reaction. More preferably, at least about 90% of the magnesium source material has a particle size of less than 0.0075 centimeters.

The aluminum source of the solid state particle agglomerate may be either aluminum oxide, aluminum hydroxide or an aluminum-containing mineral. Sources of aluminum oxide, aluminum hydroxide or an aluminum-containing mineral may include, but are not limited to, calcined alumina, alumina hydrate, feldspar, nepheline syenite, spodumene and the like. The particle size of the aluminum source used in the solid state particle agglomerate is preferably less than 0.0075 centimeters to promote a thermodynamic advantage towards the solid state particle agglomerate reaction versus the standard glass reaction. More preferably, at least about 90% of the aluminum source material has a particle size of less than 0.0075 centimeters.

The silicon source of the solid state particle agglomerate may be either silicon dioxide or a silicon-containing mineral. Sources of silicon dioxide or a silicon-containing mineral may include, but are not limited to sand, silica flour, nepheline syenite, spodumene, glass cutlet and the like. The particle size of the silicon source used in the solid state particle agglomerate is preferably less than 0.0075 centimeters to promote a thermodynamic advantage towards the solid state particle agglomerate reaction versus the standard glass reaction. More preferably, at least about 90% of the silicon source material has a particle size of less than 0.0075 centimeters.

The binder of the solid state particle agglomerate may be an alkaline earth metal sulfate or an alkaline earth metal nitrate such as, but not limited to calcium sulfate, magnesium sulfate, calcium nitrate, magnesium nitrate and the like. The amount and the type of binder are selected to provide structural integrity and strength to the solid state particle agglomerate for the handling requirement of a particular application. The binder may be present in an amount from about 1.0 weight percent to about 10.0 weight percent based on the total weight of the raw materials used in the solid state particle agglomerate. In some embodiments, the binder may be present in an amount from about 5.0 weight percent to about 10.0 weight percent based on the total weight of the raw materials used in the solid state particle agglomerate.

The raw materials of the solid state particle agglomerate, comprising the alkaline earth metal source, the aluminum source and the silicon source can be in the respective molar ratios of from about zero (0) part to about two (2) parts alkaline earth metal oxide (MO, where M is an alkaline earth metal such as calcium or magnesium) and from about zero (0) part to about two (2) parts aluminum oxide ($Al_2O_3$) with respect to one (1) part silicon dioxide ($SiO_2$). More specifically, the raw materials of the solid state particle agglomerate, comprising the calcium source, the magnesium source, the aluminum source and the silicon source can be in the respective molar ratios of from about zero (0) part to about two (2) parts calcium oxide (CaO), from about zero (0) part to about two (2) parts magnesium oxide (MgO) and from about zero (0) part to about two (2) parts aluminum oxide ($Al_2O_3$) with respect to one (1) part silicon dioxide ($SiO_2$).

In some embodiments, the raw materials of the solid state particle agglomerate, comprising the alkaline earth metal source, the aluminum source and the silicon source can be in the respective molar ratios of from about zero (0) part to about one (1) part alkaline earth metal oxide (MO, where M is an alkaline earth metal such as calcium or magnesium) and from about zero (0) part to about one (1) part aluminum oxide ($Al_2O_3$) with respect to one (1) part silicon dioxide ($SiO_2$). More specifically, the raw materials of the solid state particle agglomerate, comprising the calcium source, the magnesium source, the aluminum source and the silicon source can be in the respective molar ratios of from about zero (0) part to about one (1) part calcium oxide (CaO), from about zero (0) part to about one (1) part magnesium oxide (MgO) and from about zero (0) part to about one (1) part aluminum oxide ($Al_2O_3$) with respect to one (1) part silicon dioxide ($SiO_2$).

The solid state particle agglomerate size may be of a magnitude that promotes the attainment and retention of a homogenous distribution of raw materials in the glass batch during the glass reaction. Accordingly, the solid state particle agglomerate size may be of a similar magnitude of the other glass batch raw materials, such as, for example, the silicon dioxide source raw material, e.g., sand, used in the total glass batch. The median size of the solid state particle agglomerate may be from about 75 percent to about 1000 percent of the median size of the balancing silicon dioxide raw material used to produce the glass batch, and may be from about 85 percent to about 115 percent of the median size of the balancing silicon dioxide raw material.

The granules in the solid state particle agglomerate are formed to have a median particle size that approximates the sand balance to be used in the glass batch, which may be from about 0.015 centimeters to about 0.14 centimeters. In other embodiments, the median particle size of the granules are preferably from about 0.025 centimeters to about 0.085 centimeters.

The product of the reacted solid state particle agglomerate that occurs within the total glass batch, can be a calcium aluminosilicate or a magnesium aluminosilicate having the general formula of $(MO)_x(Al_2O_3)_y(SiO_2)_z$, wherein M is alkaline earth metal Ca or Mg, x has a value of from about zero (0) to about two (2), y has a value of from about zero (0) to about two (2), and z has a value of about one (1). In other embodiments, x has a value of from about zero (0) to about one (1), y has a value of from about zero (0) to about one (1), and z has a value of about one (1). The formed calcium aluminosilicate or magnesium aluminosilicate product and the other raw materials in the glass batch react as a total glass batch system to produce the desired glass product. Additional energy to drive the glass-forming reaction to completion is provided to the glass batch system.

EXAMPLES

The following non-limiting examples are merely illustrative embodiments of the present teachings and are not to be construed as limiting the invention, the scope of which is defined by the appended claims.

Example 1

A solid state particle agglomerate (S SPA) was produced by mixing the raw materials listed in Table 1 (values listed in Table 1 are relative weight values and may be in any common weight units such as kilograms, pounds, tons, etc.) and then granulating in an Eirich mixer (Eirich mixer model no. RV II E, Eirich Machines, Inc., Gurnee, Ill.) to an average particle size of 0.06 centimeters. The granules are heated under temperature and time conditions that are sufficient to reduce the moisture content to less than about 1.0 percent moisture to produce granules of sufficient durability. The granules were heated at a temperature of 110 degrees Celsius for 16 hours to achieve a moisture content of less than about 1.0 percent moisture. Any granules in the agglomerate greater than 0.085 centimeters in size are removed and crushed to less than 0.085 centimeters. Granules less than 0.025 centimeters in size are also removed such that at least 95% of the granules in the SSPA has a median particle size between 0.025 centimeters and 0.085 centimeters. The SSPA granules have a final composite chemistry (Table 2) that allows for an in-situ reaction into cordierite (FIG. 1) when heated above 1400 degrees Celsius. This combination of raw materials is the lowest temperature reacting point as demonstrated in the phase diagram (FIG. 1) for cordierite.

TABLE 1

Solid State Particle Agglomerate (SSPA) Raw Materials - Type and Quantity

| | |
|---|---|
| Alumina ($Al_2O_3$) | 2170.0 |
| Silica ($SiO_2$) | 3189.0 |
| Magnesium Source (MgO) | 1150.0 |
| Binder | 445.0 |
| Water | 993.0 |

TABLE 2

Solid State Particle Agglomerate (SSPA) - Chemical Analysis

| | |
|---|---|
| % CaO | 0.08% |
| % MgO | 10.74% |
| % $SiO_2$ | 40.14% |
| % $Na_2O$ | 0.01% |
| % $Al_2O_3$ | 27.38% |
| % Loss on Ignition (LOI) | 21.65% |

Example 2

In this example, the solid state particle agglomerate (SSPA) produced in Example 1 is combined with other raw materials listed in Table 3 in a glass batch recipe (values listed in Table 3 are relative weight values and may be in any common weight units such as kilograms, pounds, tons, etc.) to produce a standard fiberglass chemistry. Note that the glass produced using the SSPA versus the control glass (no SSPA) have approximately the same final glass chemistry (Table 4). The goal is to increase the melting (i.e. increase the reaction rate) as shown by the $CaO:SiO_2$ ratio in Table 3 without changing the final glass chemistry or glass properties. The $CaO:SiO_2$ ratio, also known as the flux:quartz ratio, is an index that references the eutectic phase diagram between silica ($SiO_2$) and the corresponding alkaline earth metal oxide (in this case CaO). The melting of a glass batch occurs at lower temperatures and thus is more efficient at any given temperature with an increase in the amount of alkaline earth metal oxide (CaO) per amount of $SiO_2$. Therefore, the higher the $CaO:SiO_2$ ratio value, the lower the glass batch melt temperatures and/or the greater the glass batch melting efficiency. The solid state particle agglomerate (SSPA) effectively removes other raw materials so that the remaining oxides (CaO in this case) may act more efficiently on the $SiO_2$. Thus, as shown in Table 3, the higher $CaO:SiO_2$ ratio value for a glass batch using the solid state particle agglomerate (SSPA) versus the control (0.58 versus 0.49, respectively) illustrates the advantages of using the solid state particle agglomerate (SSPA) in glass batch formulations relative to decreased melt temperatures and/or greater glass batch melting efficiency.

TABLE 3

Fiberglass Batch Recipe

| | Control Glass | Glass Using SSPA* |
|---|---|---|
| Sand | 695 | 646 |
| Dolomitic Lime | 95 | 0 |
| Limestone | 602 | 674 |
| Clay | 574 | 310 |
| SSPA* (Cordierite-like) | 0 | 337 |
| Ulexite | 34 | 33 |
| $CaO:SiO_2$ Ratio | 0.49 | 0.58 |

*SSPA = Solid State Particle Agglomerate

TABLE 4

Fiberglass Final Glass Chemistry

| | Control Glass | Glass Using SSPA* |
|---|---|---|
| % $Li_2O$ | 0.0 | 0.0 |
| % $SiO_2$ | 58.1 | 58.3 |
| % $TiO_2$ | 0.3 | 0.5 |
| % $Al_2O_3$ | 13.4 | 13.6 |
| % $B_2O_3$ | 0.8 | 0.8 |
| % $Fe_2O_3$ | 0.2 | 0.2 |
| % CaO | 23.5 | 23.6 |
| % MgO | 2.6 | 2.6 |
| % $K_2O$ | 0.1 | 0.1 |
| % $Na_2O$ | 0.1 | 0.1 |

*SSPA = Solid State Particle Agglomerate

While embodiments and applications of the invention have been shown and described, it will be apparent to those skilled in the art that modifications are possible without departing from the inventive concepts herein described. It is understood, therefore, that the invention is capable of modification and therefore is not to be limited to the precise details set forth. Rather, various modifications may be made in the details within the scope and range of equivalents of the claims without departing form the spirit of the invention.

What is claimed is:

1. A glass batch material in a solid state particle agglomerate form comprising:
a plurality of granules, each granule comprising an alkaline earth metal source material, an aluminum source material and a silicon source material, wherein the alkaline earth metal source material, the aluminum source material and the silicon source material are uniformly distributed and in close proximity within each of the granules, enabling the solid state particle agglomerate to form glass in a more energy efficient manner when heated, wherein each granule further comprises a binder selected from the croup consisting of alkaline earth metal sulfates and alkaline earth metal nitrates for holding the alkaline earth metal source, the aluminum source and the silicon source together in the granule form.

2. The glass batch material of claim 1, wherein the alkaline earth metal source material is selected from the group consisting of a calcium source material and a magnesium source material.

3. The glass batch material of claim 2, wherein the calcium source material is selected from the group consisting of calcium oxide, calcium hydroxide and a calcium-containing mineral.

4. The glass batch material of claim 3, wherein the calcium source material has a particle size of less than 0.0075 centimeters.

5. The glass batch material of claim 3, wherein at least about 90% of the calcium source material has a particle size of less than 0.0075 centimeters.

6. The glass batch material of claim 2, wherein the magnesium source material is selected from the group consisting of magnesium oxide, magnesium hydroxide and a magnesium-containing mineral.

7. The glass batch material of claim 6, wherein the magnesium source material has a particle size of less than 0.0075 centimeters.

8. The glass batch material of claim 6, wherein at least about 90% of the magnesium source material has a particle size of less than 0.0075 centimeters.

9. The glass batch material of claim 1, wherein the aluminum source material is selected from the group consisting of aluminum oxide, aluminum hydroxide and an aluminum-containing mineral.

10. The glass batch material of claim 9, wherein the aluminum source material has a particle size of less than 0.0075 centimeters.

11. The glass batch material of claim 9, wherein at least about 90% of the aluminum source material has a particle size of less than 0.0075 centimeters.

12. The glass batch material of claim 1, wherein the silicon source material is selected from the group consisting of silicon dioxide and a silicon-containing mineral.

13. The glass batch material of claim 12, wherein the silicon source material has a particle size of less than 0.0075 centimeters.

14. The glass batch material of claim 12, wherein at least about 90% of the silicon source material has a particle size of less than 0.0075 centimeters.

15. The glass batch material of claim 1, wherein the binder is present in an amount of from about 1.0 weight percent to about 10.0 weight percent based on the total weight of the solid state particle agglomerate.

16. The glass batch material of claim 1, wherein the binder is present in an amount from about 5.0 weight percent to about 10.0 weight percent based on the total weight of the solid state particle agglomerate.

17. The glass batch material of claim 12, wherein the alkaline earth metal source material, the aluminum source material and the silicon source material are in respective molar ratios of from greater than zero (0) parts to about two (2) parts alkaline earth metal oxide and from greater than zero (0) parts to about two (2) parts aluminum oxide with respect to one (1) part silicon dioxide.

18. The glass batch material of claim 12, wherein the alkaline earth metal source material, the aluminum source material and the silicon source material are in respective molar ratios of from greater than zero (0) parts to about one (1) part alkaline earth metal oxide and from greater than zero (0) parts to about one (1) part aluminum oxide with respect to one (1) part silicon dioxide.

19. The glass batch material of claim 1, wherein the granules have a median size between about 0.015 to about 0.14 centimeters.

20. The glass batch material of claim 1, wherein the granules have a median size between about 0.025 to about 0.085 centimeters.

* * * * *